Figure 1:
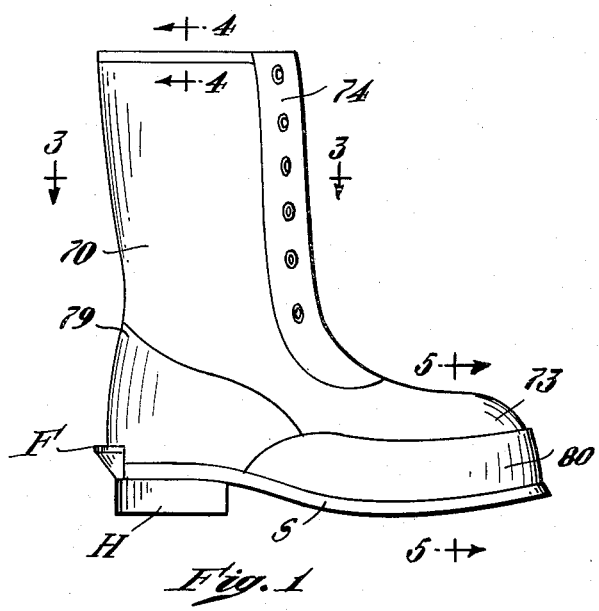

Dec. 5, 1961     M. CAMPAGNA     3,011,187
METHOD OF MAKING HEAT-INSULATED WATERPROOF
GUSSET-TYPE FOOTWEAR
Original Filed May 28, 1953     4 Sheets-Sheet 1

INVENTOR.
Michele Campagna
BY
ATT'YS

Dec. 5, 1961         M. CAMPAGNA                3,011,187
      METHOD OF MAKING HEAT-INSULATED WATERPROOF
                    GUSSET-TYPE FOOTWEAR
Original Filed May 28, 1953                4 Sheets-Sheet 2
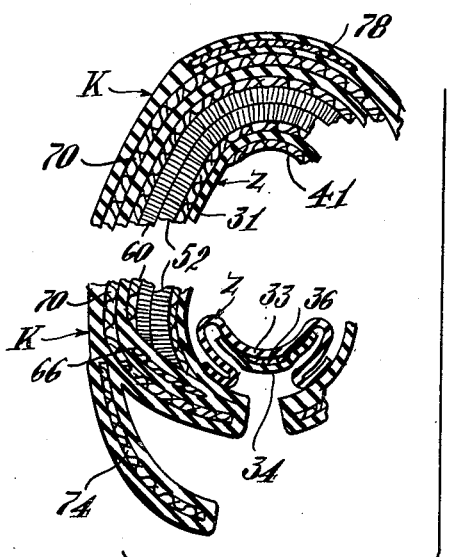
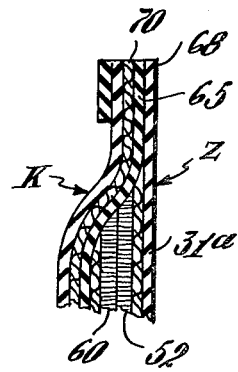
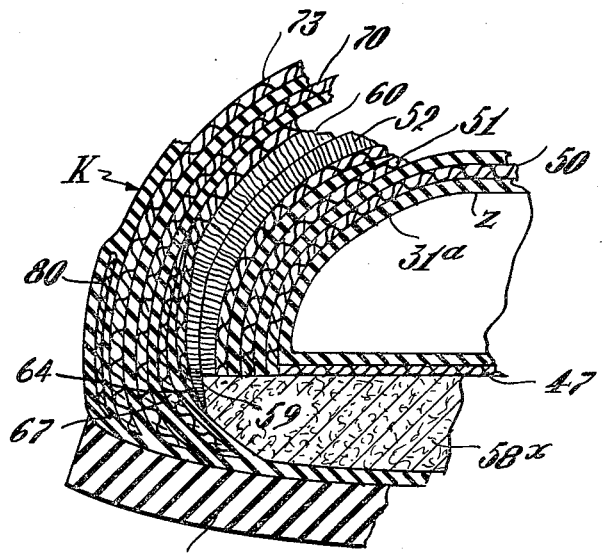
INVENTOR.
Michele Campagna
BY
Roberts Cushman Grover
ATT'YS Dec. 5, 1961

M. CAMPAGNA 3,011,187

METHOD OF MAKING HEAT-INSULATED WATERPROOF
GUSSET-TYPE FOOTWEAR

Original Filed May 28, 1953

4 Sheets-Sheet 3

INVENTOR.
MICHELE CAMPAGNA
BY
Roberts Cushman & Grean
ATT'YS.

Dec. 5, 1961  M. CAMPAGNA  3,011,187
METHOD OF MAKING HEAT-INSULATED WATERPROOF
GUSSET-TYPE FOOTWEAR
Original Filed May 28, 1953  4 Sheets-Sheet 4

INVENTOR.
Michele Campagna
BY
Roberts Cushman Grieder
ATT'YS

United States Patent Office 3,011,187
Patented Dec. 5, 1961

3,011,187
METHOD OF MAKING HEAT-INSULATED WATERPROOF GUSSET-TYPE FOOTWEAR
Michele Campagna, Bristol, R.I., assignor to Bristol Manufacturing Corporation, Bristol, R.I., a corporation of Rhode Island
Original application May 28, 1953, Ser. No. 358,037, now Patent No. 2,897,610, dated Aug. 4, 1959. Divided and this application May 14, 1959, Ser. No. 813,109
4 Claims. (Cl. 12—142)

This invention pertains to a method of making footwear, particularly waterproof footwear, inclusive, for example, of shoes or boots, whether of ankle height, knee length or hip length, and including those which are worn outside of other foot coverings, such as socks, slippers, shoes, or the like, as well as those which are worn inside of other foot coverings, for example, heat insulating inserts to be worn within shoe-pacs or similar types of footwear.

Waterproof footwear, comprising such articles as are included in the above category, is frequently worn under low temperature conditions, for example, by fishermen wading in cold trout streams; by fishers on commercial fishing boats exposed to icy sea water; by lumbermen, trappers, etc., who must tramp through snow or slush; by farmers, police and other outdoor workers; as well as by members of the Armed Forces, especially those stationed in Arctic climates where temperatures fall far below zero. The usual rubber boot or shoe, while adequately excluding water, rates very low as respects its heat insulating properties.

Conventional rubber boots have no front opening and thus afford adequate protection against the entry of water, but because they have no front opening, they cannot be made to fit the foot snugly and do not make good walking boots. In order to provide a watertight boot, which is comfortable to walk in, for example a boot for military use, it is necessary to provide the boot with a front or "throat" opening or its equivalent and to exclude water by providing the boot with a watertight tongue to span the opening. Customarily, the tongue is of relatively thin material, and thus even though the walls of the boot itself may possess heat insulating characteristics, the front of the foot is not adequately protected against cold.

The present invention has for one object the provisions of a method of making a walking boot which is completely waterproof, although having a front opening, and which provides adequate heat insulation at all points, including the closure for the front opening.

A further object is to provide a method of making a waterproof walking boot having a lining which at every point, except at the extreme upper edge of the boot, is separated from the outer skin of the boot by insulation.

A further object is to provide a method of making a waterproof walking boot whose upper is so devised as to protect the entire periphery of the ankle portion of the wearer's foot from cold.

A further object is to provide a method of making a waterproof boot having a front opening and which has a lining which is separated at every point in out-of-contact relation to the outer skin of the boot, except at the extreme upper edge of the boot.

A further object is to provide a method of making a waterproof boot having a front opening and a bellows type tongue for closing the opening and wherein the bellows tongue comprise outer and inner skins defining between them an airtight chamber.

Figure 2:
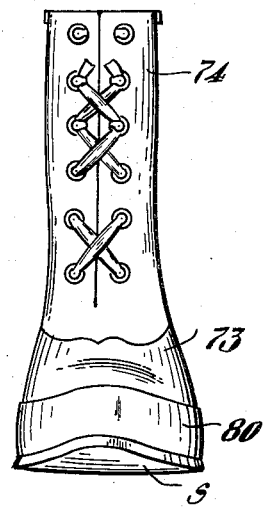
Figure 26:
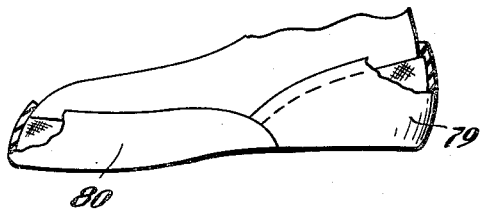
Figures 23, 24:
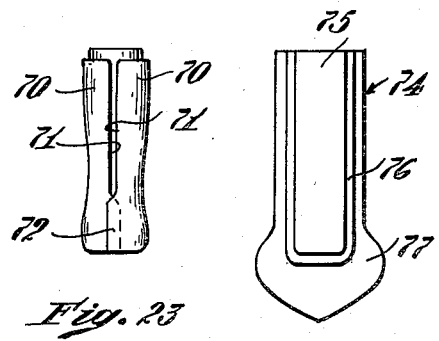
Figures 25, 27:
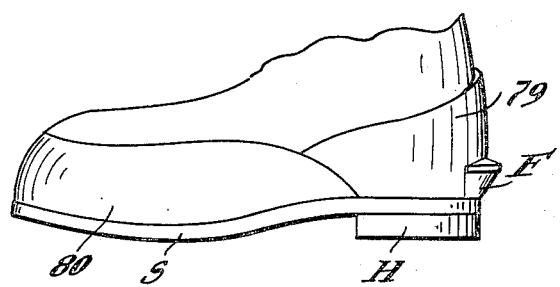
Figure 6:
Figure 7:
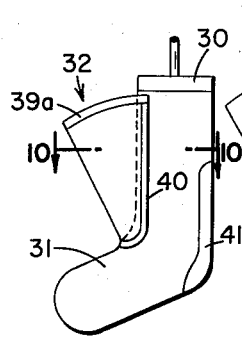
Figure 8:
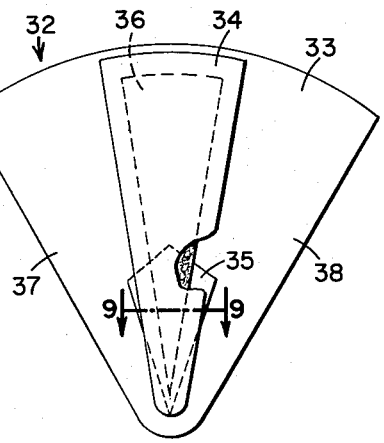
Figure 9:
Figure 10:
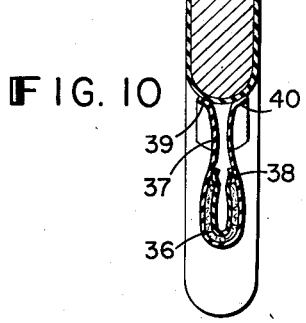
Figure 11:
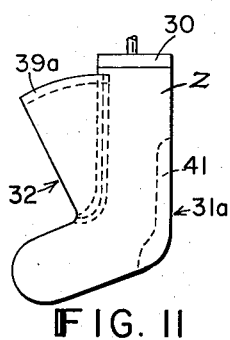
Figure 12:
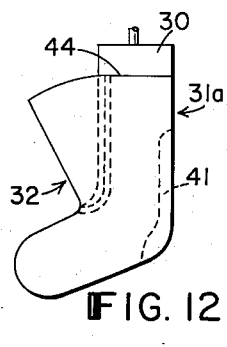
Figure 13:
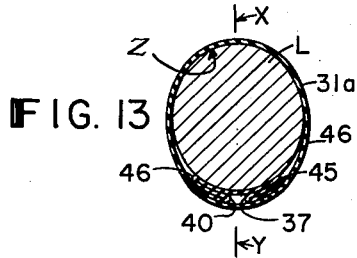
Figure 14:
Figure 15:
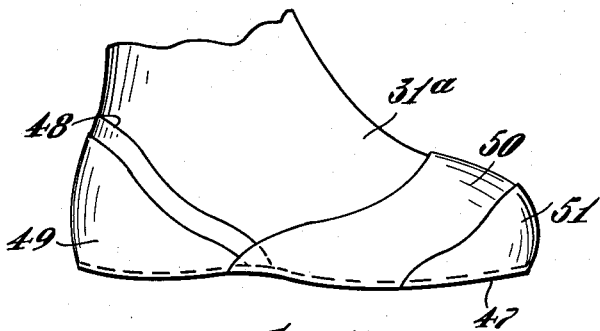
Figure 16:
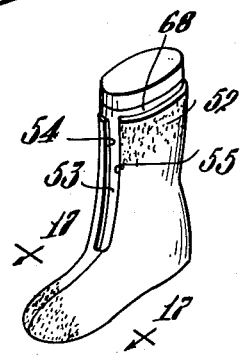
Figure 17:
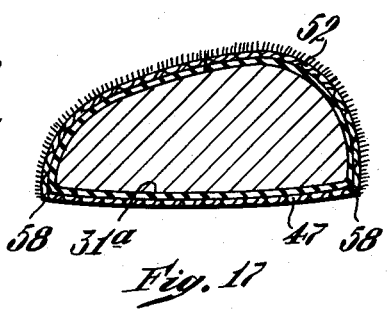
Figure 18:
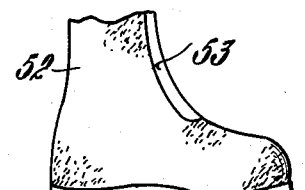
Figures 19, 20:
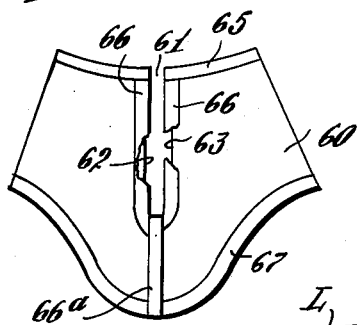
Figure 21:
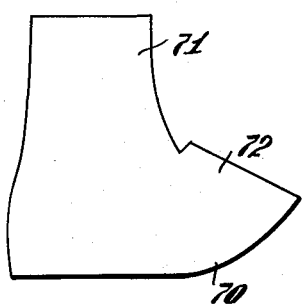
Figure 22:
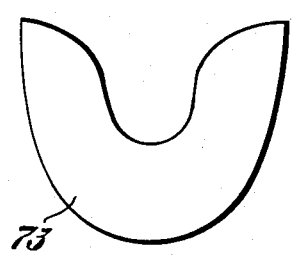

Further objects and advantages of the invention will be pointed out in the following more detailed description and by reference to the accompanying drawings, wherein:

FIG. 1 is a side elevation of a boot constructed by the novel method provided by this invention;
FIG. 2 is a front elevation of the boot of FIG. 1 showing the front opening of the boot closed;
FIG. 3 is a fragmentary, diagrammatic, horizontal section on the line 3—3 of FIG. 1, to larger scale, and with the throat partly open;
FIG. 4 is a fragmentary diagrammatic section on the line 4—4 of FIG. 1;
FIG. 5 is a fragmentary diagrammatic vertical section on the line 5—5 of FIG. 1;
FIG. 6 is a diagrammatic perspective view illustrative of the first step in the preparation of a boot according to the method of the present invention;
FIG. 7 is a perspective view similar to FIG. 6 illustrating the first step in attaching the tongue;
FIG. 8 is a diagrammatic plan view partly broken away and to larger scale, showing the tongue prior to its assembly with other parts;
FIG. 9 is a diagrammatic section on the line 9—9 of FIG. 8 showing the insulation of the center panel of the tongue;
FIG. 10 is a diagrammatic section to larger scale on the line 10—10 of FIG. 7;
FIGS. 11 and 12 are perspective views similar to FIG. 7, illustrating steps of the method following the step illustrated in FIG. 7;
FIG. 13 is a diagrammatic transverse section through the leg portion of the inner or lining skin of the boot, showing the sock or lining skin as having been removed from the paddle last, turned inside out, and relasted on a boot last;
FIG. 14 is a diagrammatic perspective view showing the sock or inner skin mounted on the boot last and illustrating the first step in the formation on the bottom of the boot;
FIG. 15 is a fragmentary perspective view illustrating the application of reenforce elements to the heel and forepart portions of the inner or lining skin;
FIG. 16 is a perspective view illustrating the application of the inner insulating ply to the inner skin;
FIG. 17 is a section substantially on the line 17—17 of FIG. 16 but to larger scale;
FIG. 18 is a view similar to view 16 but illustrating the application of the insulating cushion sole to the bottom of the inner or lining skin;
FIG. 19 is a fragmentary plan view showing the outer insulating ply with various trim elements associated therewith;
FIG. 20 is a perspective view showing the outer insulating ply with its trim elements assembled with the inner skin;
FIG. 21 is a diagrammatic elevation of one of the waterproof combination top-and-quarter members of the boot;
FIG. 22 is a plan view of the waterproof vamp element;
FIG. 23 is a front elevation of the structure after the application of the quarter and vamp elements to the outer surface of the outer insulating ply;
FIG. 24 is a front elevation of the eyelet stay before its application to the boot;
FIG. 25 is an elevation of the back stay;
FIG. 26 is a fragmentary side elevation showing the outer foxing pieces in place; and
FIG. 27 is a view similar to FIG. 26, but showing the outer sole and heel in place.

In accordance with the present invention a novel method of procedure is followed in making the improved boot. This method includes certain steps which are customary in rubber boot manufacture and others which are believed to be novel but all are combined in a new sequence to produce a boot having the desired novel characteristics. It will be understood that the method about to be described represents the best practice known at the present time but that any equivalent procedure, producing approximately the same results and which comes within the terms of the appended claims, is to be considered as within the scope of the invention. It is further to be understood that certain of the hereinafter suggested steps may be omitted and that certain well-known and customary steps, not herein specifically referred to, may be used or introduced as deemed desirable by those skilled in the art.

In accordance with the preferred procedure and referring to the drawings for illustration of the principal steps, the first step consists in dipping a "paddle last" 30 (FIG. 6) in a suitable coagulant for rubber latex (such coagulants being well known to those skilled in art) and then dipping the last into liquid latex, thereby forming on the paddle last a thin coating or film which quickly sets to form a seamless lining sock or skin 31 on the last. If desired, the thickness of this skin may be increased by repeated dippings.

The next step is to assemble a tongue or gusset 32 with the lining sock or skin 31. This tongue or gusset 32 (FIG. 8), in accordance with the present invention, comprises the substantially V-shaped piece 33 of thin, waterproof sheet material, for example flexible textile fabric, desirably nylon tricot, the upper end of this V-shaped piece being of a width at least as great as the maximum width to which the upper end of the throat opening of the boot may be extended while the boot is being donned. With this wider V-shaped piece 33 there is associated a narrower V-shaped piece 34, preferably of the same material as the part 33 and which, when assembled with the latter, is arranged symmetrically with respect to the part 33 and with its lower, narrow end arranged a short distance above the lower end of the part 33. The part 34 is of a width at its upper end substantially greater than the maximum width of the upper end of the throat opening of the completed boot when the boot is in use and laced up. Before attaching the part 34 to the part 33, it is desirable to place on the part 33 a reenforce element 35, for example, a piece of strong textile fabric which may or may not be impregnated or frictioned with rubber and which as here shown is of approximately kite-shape, with its wider end up and with its narrower end closely adjacent to the narrower end of part 33. A ply 36 of insulating material is arranged to overlie the reenforce element 35 after the latter has been assembled with the part 33. This insulating ply 36 is here illustrated by way of example as a piece of napped textile fabric, for example woolen blanket cloth, napped on one side only. However, material napped on both sides might be employed, as well as other flexible insulating materials, for instance a sheeted latex foam, and when hereinafter reference is made to textile fabric napped on one face only, it is to be understood as by way of example only and not by way of limitation. This insulating element 36 is here shown as a V-shaped piece, somewhat narrower at its upper end than the part 34, and which is arranged in symmetrical relation to the part 33 and with its napped surface opposed to the part 33. Having assembled the reenforce member 35 and the insulating member 36 with the part 33, the part 34 is laid over the part 36 and the margin of the part 34 is adhered to the part 33, the presence of the napped insulating member 36 between the parts 33 and 34 resulting in the separation of the parts 33 and 34 at the location of the insulating material so that when the margins of the part 34 are adhered to the part 33 there results a completely sealed pocket within which the insulating material is housed. The margins of the part 34 may be secured to the part 33 in any desired manner, for example by the employment of a suitable adhesive medium.

The tongue or gusset 32, prepared as just described, comprises a central panel in which the insulating material is housed and lateral wings 37 and 38 each consisting only of the relatively thin flexible material of which the part 33 is formed. The marginal portions 39 and 40 (FIGS. 7 and 10) of these wings are now adhered to the forward portion of the seamless lining sock or skin 31 on the paddle last 30. In thus adhering the margins 39 and 40 to the skin 31, the tongue is first folded so that the central panel portion, comprising the insulating material, is doubled together (as shown in FIG. 10). With the tongue in this folded or doubled condition, the opposite wing portions 37 and 38 are united to each other at their upper edges, for example, by the use of an adhesive sealing strip 39a (FIG. 7) to form a seal along the upper margin of the doubled tongue. Thus the interior of the folded tongue is sealed against the entrance of fluid into the space between the opposed wings 37 and 38.

Following or preceding the attachment of the tongue, a slip strip 41 (FIG. 7), for example of nylon or stockinet fabric (although any flexible material which is resistant to abrasion and which affords a slippery surface may be used), is adhered to the heel portion of the lining sock 31. The lining sock 31 (with its attached tongue and slip strip), still mounted on the paddle last, is now dipped into a waterproof liquid, for example latex or nylon, thus forming a seamless film or layer Z (FIGS. 3 and 5) which covers all of the exposed surfaces of the lining sock, tongue and slip strip, and which provides airtight sealing of the tongue to the lining sock. The sealing strip at 39a prevents the liquid from flowing down into the space between the wings of the folded tongue. More than one dipping may be performed, if a thicker film or layer be desired. After this film has set, the upper portion of the lining sock and tongue is trimmed off along the line 44 (FIG. 12) so as to remove the sealing strip 39a, whereby the wings of the tongue are freed from each other so that the tongue may open out at its top.

The assembly (FIG. 12), now comprising the adhering inner and outer layers of waterproof material, is stripped from the paddle last and turned inside out, thus disposing the last-formed seamless film Z at the inside. The resultant liner 31a is now relasted upon a boot last L (FIG. 13) with said last-formed seamless film contacting the last. While introducing the last L, the wing portions 37 and 38 of the tongue 32 are folded along substantially vertical lines 45 and 46 (FIG. 13) so that the center of the insulating panel portion of the tongue is disposed symmetrically with reference to the front-to-rear vertical plane X—Y of the last L. A thin flexible insole element 47 (FIG. 14) of textile fabric, coated with latex, or frictioned with rubber compound on both sides, is now preferably adhered to the bottom surface of the liner 31a. A heel stay 48 (FIG. 15) of textile fabric coated with latex or frictioned with rubber compound is now adhered to the heel portion of the liner 31a, and to the heel portion there is also adhered a heel piece or counter 49 of rag stock. A vamp reenforce of coated fabric 50 is adhered to the forepart portion of the liner 31a, and a toe-cap 51 of rag stock is applied.

An inner insulating ply 52 (FIGS. 16 and 17) is now adhered to the outer surface of the liner 31a. This insulating ply may, for example, be napped textile fabric, for instance wool blanket cloth napped on one side only, the base fabric of this ply being directly adhered to the liner 31a so that the napped surface of the insulating ply is outwardly exposed. While, as above noted, textile fabric napped on one side only has given highly satisfactory results, the invention is not necessarily limited to the employment of this particular insulating material, but contemplates the employment of any material having equivalent insulating characteristics. The material forming the insulating ply 52 is so cut that when it is applied to the liner 31a, it completely covers the latter, except for the bottom, and a marginal portion 68 of the liner 31a at the top of the latter and a narrow strip 53 of the liner 31a at the approximate location of the throat opening of the completed boot, the front edges 54 and 55 (FIG. 16) of the ply 52 being spaced apart a distance of the order of one inch at this strip 53. The ply 52 does not extend below the level of the sole element 47, its lower edges 58 being substantially flush with the bottom surface of the said sole element.

An insulating mid-sole 58x (FIG. 18) is now adhered to the bottom surface of the sole element 47, if the latter be employed, or directly to the bottom surface of the liner 31a, if said sole element is not provided.

The insulating mid-sole 58x (FIG 5) is of suitable heat-insulating material, desirably resilient, for example, a good grade of wool felt which may be of a thickness, for example, of three-quarters of an inch. Desirably this insulating insole is so shaped at its lateral margins as to provide an upwardly-directed beveled edge 59 (FIG. 5) which overlaps the lower edge 58 (FIG. 17) of the insulating ply 52.

There is also provided an outer insulating ply 60 (FIG. 19) which may, for example, be of the same material as the ply 52. This outer insulating ply is cut substantially to the same shape as the ply 52, although of slightly larger dimensions. It comprises right and left portions shaped, when assembled, to provide the narrow gap 61 at the location of the throat opening, this gap being defined by the parallel edges 62 and 63. The lower margins of the ply 60 are preferably beveled at 64 (FIG. 5) and its lower edge is below the level of the upper face of midsole 58x so that the lower margin of the ply 60 laps the lateral edge of the mid-sole 58x. The ply 60 is provided with a sealing strip 65 at its upper margin, the strip 65 extending above the upper edge of the ply 60. The ply 60 is also provided with sealing strips 66 at those margins which border the gap 61, and with a sealing strip 66a, at its forepart portion, which joins the abutted edges of the right and left portions of the ply 60. The ply 60 is assembled with the parts carried by the boot last L so that the napped surface of the ply 60 is disposed iwardly, that is to say, in opposition to the napped surface of the inner ply 52, and with the edges 62 and 63 of the fabric of the ply 60 opposed. In assembling the ply 60 with the parts already mounted on the boot last L, the sealing strip 65 at the upper edge of the ply 60 is adhered to the upper exposed margin 68 (FIG. 16) of the liner 31a, while the sealing strips 66 are adhered to the liner 31a within the gap 53 (FIG. 16) between the edges 54 and 55 of the right and left parts of the insulating ply 52.

The insulating ply 60 also has a lasting strip 67 (FIG. 19) at its lower margin and, in assembling the parts, this strip is drawn inwardly over the bottom of the mid-sole and adhered to the latter.

Right and left combined top and quarter members 70 (FIG. 21), of fabric coated with latex or frictioned with rubber, are provided, each of these members having a substantially vertical front edge 71 and a forepart flap portion 72. There is also provided a vamp 73 (FIG. 22) of similar material. The parts 70 and 73 are assembled with and adhered to the outer or base-fabric surface of the outer insulating ply 60, the vertical edges 71 of the right and left member 70 being arranged at the front of the boot and spaced apart, for example, approximately ⅛ of a ninch (FIG. 23) while the flaps 72 of the two parts 70 are overlapped and adhered to each other. The spacing of the edges 71 exposes the liner 31a at the front of the boot to facilitate the slitting of the liner from the top of the boot down as far as the throat opening is to extend, hereby freeing the tongue to expand laterally. A front stay 74 is provided, this stay, as shown in FIG. 24, comprising a strip 75 of coated fabric, a U-shaped piece 76 of fabric coextensive with the margin of and adhered to one face of the part 75, and a part 77, wider and longer than part 75, which is adhered to the other face of the piece 75. This composite stay is adhered to the parts 70 and 73 at the front of the boot in symmetrical relation to the gap between the edges 71 of the part 70. A heel stay 78 (FIG. 25) is also provided and adhered to the back of the boot. If desired, a steel shank piece (not shown) may now be applied to the bottom of the mid-sole 58x and this shank piece may be covered by the application of a piece of fabric, if desired. The entire boot is now dipped in latex, or equivalent waterproofing material, which is allowed to set and thus provides a seamless coating K (FIGS. 3 and 5) extending over the entire surface of the boot. Forepart foxings 79 and 80 (FIGS. 26 and 27), outer sole S, heel H, and a ski-shelf F are now assembled and united to the other parts, and the exterior of the boot is sprayed with colorless lacquer and then the boot is vulcanized. Thereafter the outer skin of the boot is slit from its top to a point near the lower end of the tongue, thereby providing the throat opening at the front of the boot.

Eyelets and/or hooks are applied, and other customary or desirable finishing operations are performed to complete the boot ready for the market.

By the above procedure a boot is provided which comprises an interior shell or skin, whose inner surface is a seamless, waterproof film which provides a very smooth and slippery surface, making it easy to don and doff the boot and also making the boot very comfortable to wear. This inner skin or shell, as here specifically illustrated, is insulated from the outer skin or shell of the boot by opposed independent plies of insulating fabric, which collectively form a resiliently yieldable layer which prevents contact of the inner and outer shells and provides a multitude of minute air spaces, and at the bottom of the boot by the thick heat-insulating sole. It will be noted that there is no contact of the inner skin of the boot directly with the outer skin or shell, except at the extreme upper edge of the boot and at opposite sides of the throat opening. However, although the outer and inner shells do contact at the opposite edges of the throat opening, the central panel of the tongue, which spans the throat opening, contains heat-insulating material. When the boot is worn, the lateral margins of this central panel of the tongue overlap the insulated portions of the upper at opposed edges of the throat opening so that the space which receives the ankle of the wearer is insulated throughout its entire periphery.

It will also be noted that all insulation, including that in the upper portion of the boot and in the bottom, as well as in the tongue, is sealed leaktight between outer and inner shells of waterproof material so that it is impossible for moisture, either from the foot or from the exterior of the boot, to enter the insulating material and thus reduce its effective insulating properties.

While one desirable embodiment of the invention has herein been illustrated and described by way of example, it is to be understood that the invention is broadly inclusive of any and all modifications, either of materials or method steps, which fall within the scope of the appended claims.

This application is a division of my copending application for Letters Patent for Heat Insulated, Gusset-Type, Waterproof Footwear, Serial Number 358,037, filed May 28, 1953, which has matured into Patent No. 2,897,610 granted August 4, 1959.

I claim:

1. That method of making a boot which comprises as steps: providing a paddle last with a coating of moisture-impervious material, providing a tongue of approximately V-shape, having thin and flexible wing portions, but having at its central part a pocket containing heat insulating material, folding the tongue about its longitudinal axis of symmetry, sealing together the upper edges of the folds of the folded tongue, adhering the lateral margins of the wing portions to the coating on the paddle last at opposite sides, respectively, at the forward edge of the paddle last, dipping the paddle last with its coating and adherent tongue in a coating material, allowing the coating so formed to set, unsealing the upper edges of the folds of the tongue, removing the lining sock thus formed from the paddle last, turning the lining sock inside out thereby producing a seamless liner, introducing a boot last into said seamless liner, disposing the thin wing portions of the tongue in folds symmetrically arranged at opposite sides of the front-to-rear vertical plane of the boot last.

2. That method of making a seamless liner for incorporation in a boot which comprises as steps: providing a peripherally, uninterrupted waterproof lining sock, providing a tongue comprising a relatively thick insulating central portion and relative thin wing portions, doubling the tongue so that the wing portions form two opposed registering plies, temporarily sealing said plies together at the top of the tongue, adhering the margins of the wing portions to the top of the lining sock at opposite sides respectively of the front center of the lining sock, dipping the lining sock with its attached tongue in a liquid waterproof substance, allowing said substance to dry, removing the sock from the last, turning the lining sock inside out and removing the temporary sealing means from the top portion of the tongue thereby to permit the wings to separate.

3. That method of making a boot which comprises as steps: providing a paddle last with a coating of waterproof material, thereby providing on the last a seamless lining sock, providing a tongue, doubling the tongue along its center of symmetry to provide right and left plies, temporarily sealing together said plies at the top of the tongue, adhering the margins of the tongue to the lining sock on the paddle last at opposite sides respectively of the front edge of the paddle last, adhering heel and toe reinforcements to the lining sock while on the paddle last, dipping the paddle last into liquid nylon, allowing the nylon to dry, trimming the lining sock at the upper part of the paddle last and removing the temporary sealing means from the upper part of the tongue, stripping the lining sock from the paddle last and turning it inside out thereby providing a seamless liner, introducing a boot last into said liner, adhering a ply of napped textile fabric to the leg portion and to the side and top portions of the foot of the liner, said fabric extending about the sides and rear of the liner from the junction of one margin of the tongue and the liner to the junction of the other margin of the tongue and the liner, and from the lower end of the tongue downwardly to the level of the sole portion of the liner, arranging a second ply of napped textile fabric to overlie the first napped ply, the napped surfaces being opposed, applying sealing strips to join the edges of the two textile plies leaktight to each other, adhering waterproof vamp and top members to the exposed surface of the outer of the napped textile plies, dipping the resultant assembly in a liquid waterproofing medium for coating the assembly, allowing the last-named coating to dry, adding sole, heel and throat-closure means, slitting the liner between the margins of the tongue for permitting the front of said assembly to open, and removing the boot from the last.

4. That method of making a boot which comprises as steps: providing a paddle last with a coating of waterproof material, thereby providing on the paddle last a seamless lining sock, providing a tongue having thin and flexible wing portions, but having at its central part a pocket containing heat-insulating material, doubling the tongue along its center of symmetry to provide right and left plies, temporarily sealing together said plies at the top of the tongue, adhering the margins of the tongue wings to the lining sock on the paddle last at opposite sides respectively of the front edge of the paddle last, applying waterproofing material to the paddle last, removing the temporary sealing means from the upper part of the tongue, stripping the lining sock from the paddle last and turning it inside out, thereby forming a seamless liner, introducing a boot last into said liner, adhering a ply of insulating material to the leg portion and to the side and top portions of the foot of said liner, said material extending about the sides and rear of said liner from the junction of one margin of the tongue and said liner to the junction of the other margin of the tongue and said liner, and from the lower end of the tongue downwardly to the level of the sole portion of the liner, adhering waterproof vamp and top members to the exposed surface of the insulating material, applying to the lining sock assembly a liquid waterproofing material for coating the liner, allowing the coating to dry, adding sole, heel and throat-closure means, slitting the lining sock between the margins of the tongue for permitting the front of the sock to open, and removing the completed boot from the boot last.

References Cited in the file of this patent

UNITED STATES PATENTS

| | | |
|---|---|---|
| 1,606,797 | Julian | Nov. 16, 1926 |
| 2,761,159 | L'Hollier et al. | Sept. 4, 1956 |